June 3, 1941.  H. L. EASTUS  2,244,291
MACHINE FOR ALIGNING GLASS BLOCK SECTIONS AND PRESSING THEM TOGETHER
Filed Nov. 8, 1939  5 Sheets-Sheet 1
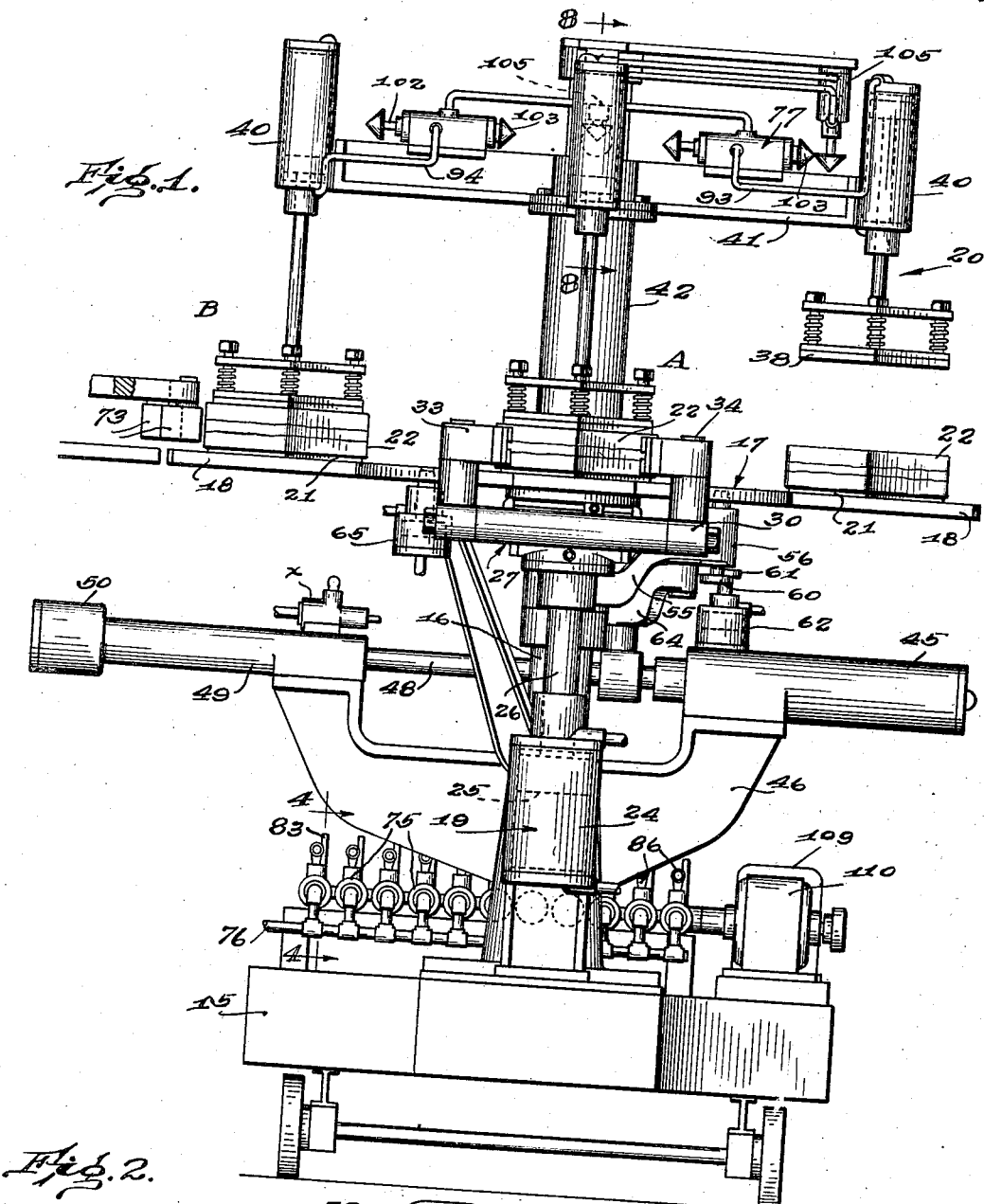
H. L. Eastus
INVENTOR.
BY Rule & Hoge,
ATTORNEYS.

June 3, 1941.  H. L. EASTUS  2,244,291
MACHINE FOR ALIGNING GLASS BLOCK SECTIONS AND PRESSING THEM TOGETHER
Filed Nov. 8, 1939  5 Sheets-Sheet 2

H. L. Eastus
INVENTOR.
BY *Rule & Hoge*
ATTORNEYS.

June 3, 1941.                    H. L. EASTUS                    2,244,291
       MACHINE FOR ALIGNING GLASS BLOCK SECTIONS AND PRESSING THEM TOGETHER
                        Filed Nov. 8, 1939            5 Sheets-Sheet 3
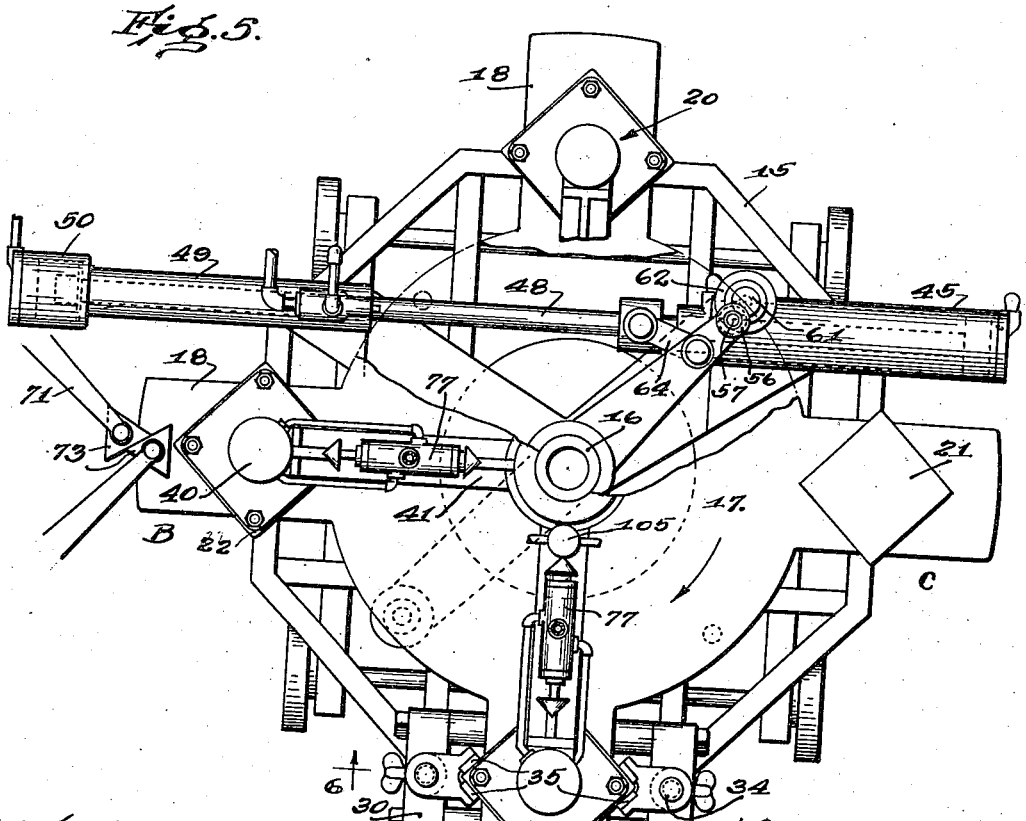
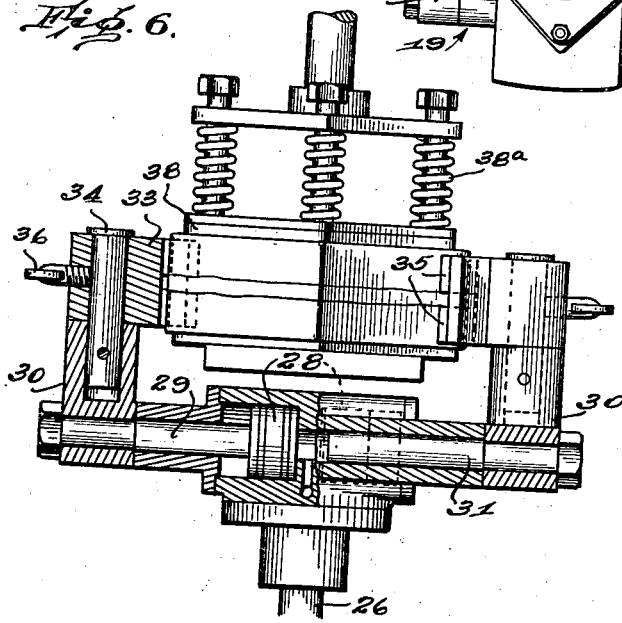
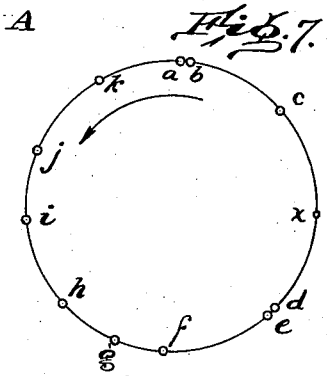
H. L. Eastus
INVENTOR.
BY
ATTORNEYS.

June 3, 1941.　　　　　H. L. EASTUS　　　　　2,244,291
MACHINE FOR ALIGNING GLASS BLOCK SECTIONS AND PRESSING THEM TOGETHER
Filed Nov. 8, 1939　　　　5 Sheets-Sheet 4
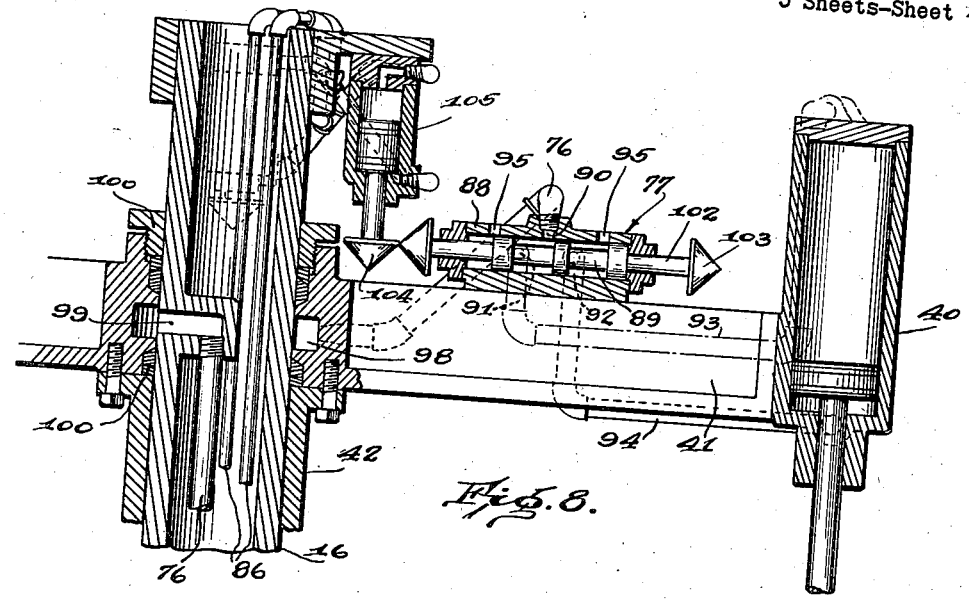
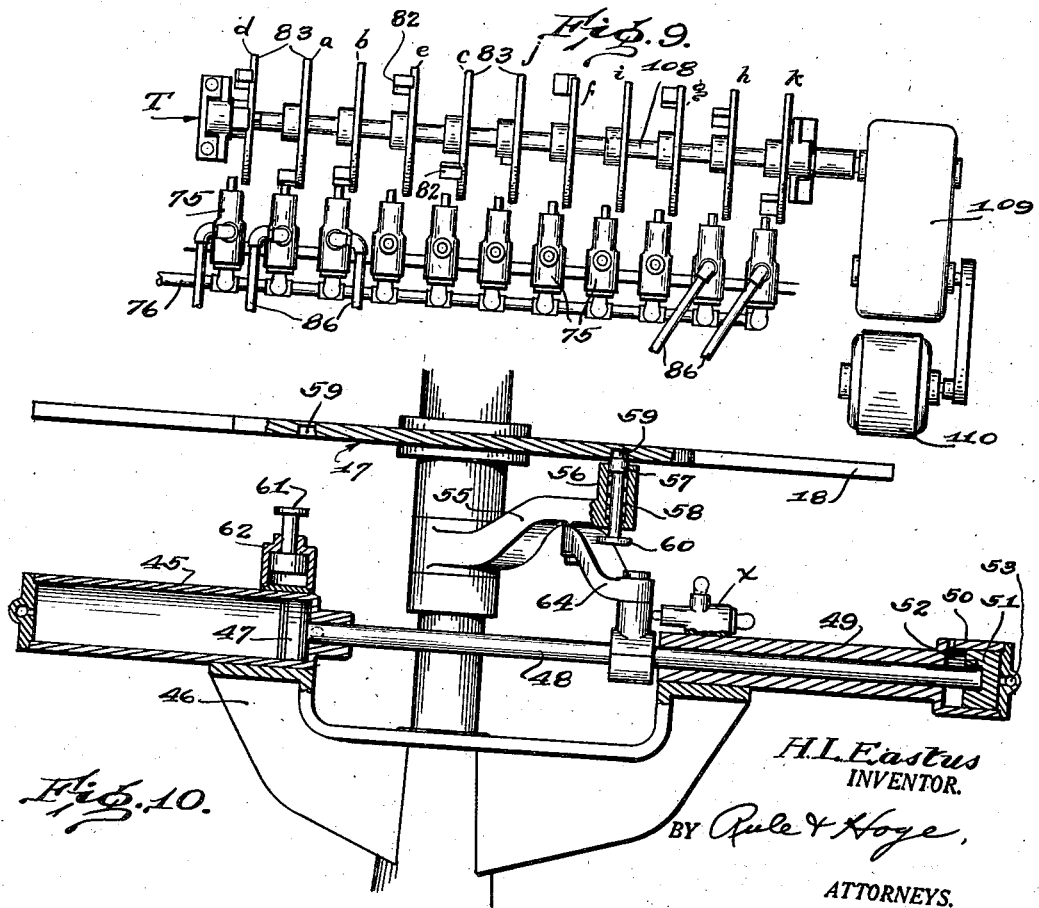

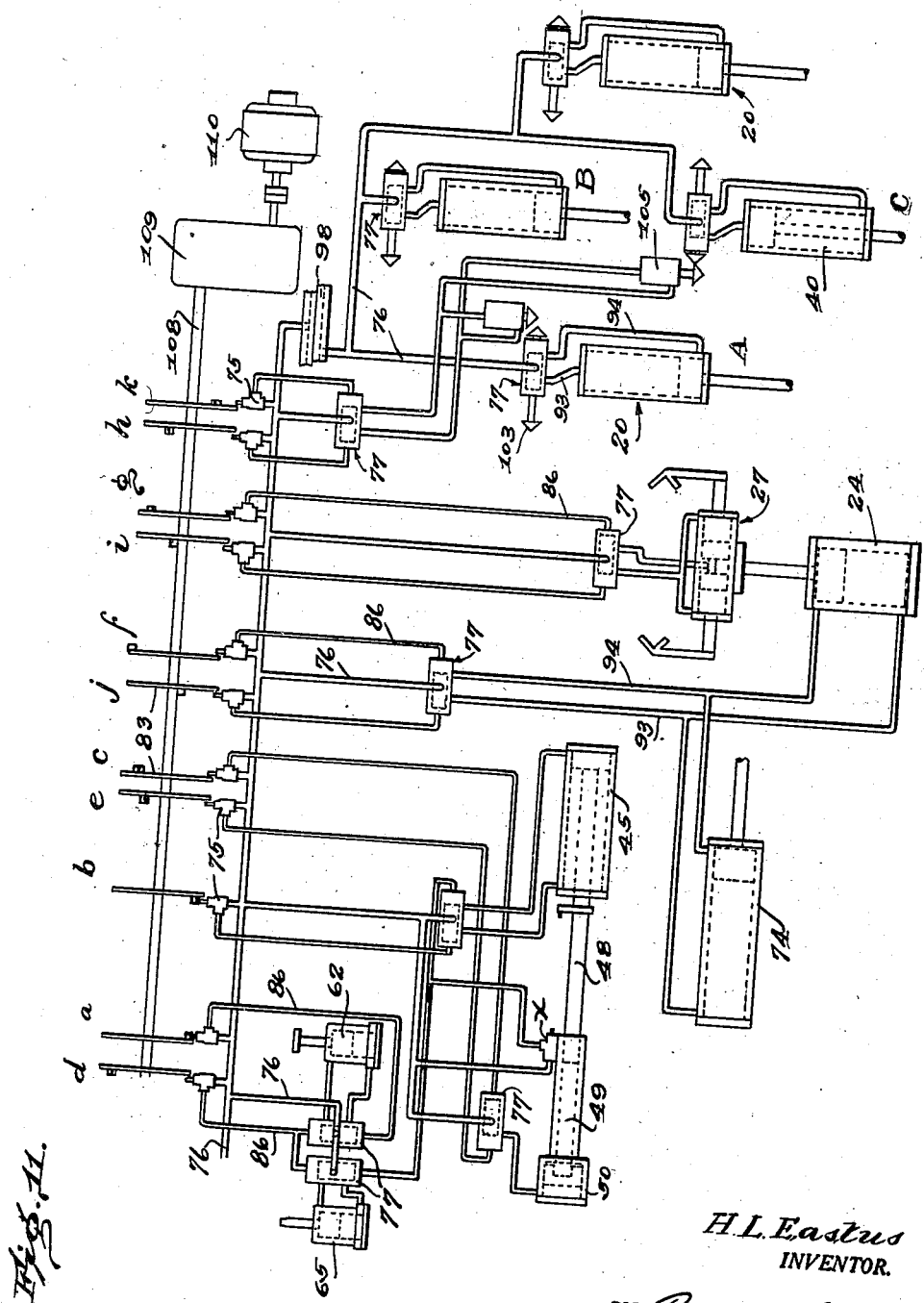

Patented June 3, 1941

2,244,291

UNITED STATES PATENT OFFICE 2,244,291

MACHINE FOR ALIGNING GLASS BLOCK SECTIONS AND PRESSING THEM TOGETHER

Harold L. Eastus, Muncie, Ind., assignor to Owens-Illinois Glass Company, a corporation of Ohio Application November 8, 1939, Serial No. 303,456

4 Claims. (Cl. 49—1)

The present invention relates to improvements in glass block handling machines and is directed particularly to a machine for automatically aligning pairs of glass block sections, after bonding material has been applied to the sections, to form a completed block.

It is an object of this invention to provide a machine adapted to receive a pair of glass block sections at a loading station, align and press the sections together at said station, and automatically move the block to a succeeding station where excess bonding material is automatically removed from the surface of the block.

Another object of the invention is the provision of automatic means for controlling successive operations of the machine through a complete cycle.

Other objects and features of novelty will become apparent during the course of the following description.

Referring to the drawings:

Fig. 1 is a front elevational view of the machine;

Fig. 2 is a plan view of the block wiping mechanism;

Fig. 5 is a plan view of the machine;

Fig. 6 is a detail sectional view taken on line 6—6 of Fig. 5;

Fig. 7 is a diagrammatic chart of the cycle of operation;

Fig. 8 is a sectional view taken substantially on line 8—8 of Fig. 1;

Fig. 9 is a plan view of the timing mechanism;

Fig. 10 is a sectional view of the table indexing mechanism; and

Fig. 11 is a diagrammatic piping chart showing the air supply lines, air motors and controls.

Generally, the apparatus comprises a wheeled base 15 having a stationary column 16 mounted centrally thereon and rotatably supporting a block carrying table 17. The table is provided with radial arms 18 or extensions on which the blocks are supported while passing through the various stages of operation. Intermittent rotary motion is imparted to the table for periodically indexing it to the several stations which are located 90° apart. A pair of block sections for example, rectangular hollow glass block sections, to be joined together, are placed on one of the arms 18 at the loading station indicated on Fig. 5 at A. At this station air operated aligning mechanism 19 mounted on the base is brought into operation to positively adjust each section with relation to the other to form the completed block. Upon completion of this operation, the table is indexed 90°, in a manner to be described presently, to a wiping station B (Fig. 5) where excess bonding material is wiped or otherwise scraped from the surface of the block. It will become apparent from the following description that the aligning and wiping operations at stations A and B respectively take place substantially simultaneously within the period in which the table is at rest.

Pressing units 20 or heads for applying top pressure to the blocks are mounted for rotation with the table and are lowered into contact with the blocks at station A immediately following the aligning of the block sections. The heads remain in pressing contact with the blocks throughout the remainder of the cycle until the blocks reach the unloading station C. Air operated piston motors are employed for performing the various operations and are controlled by a timing mechanism T (Figs. 1, 3, 9 and 11) which operates valves in the air supply lines leading to the motors.

Figure 3:
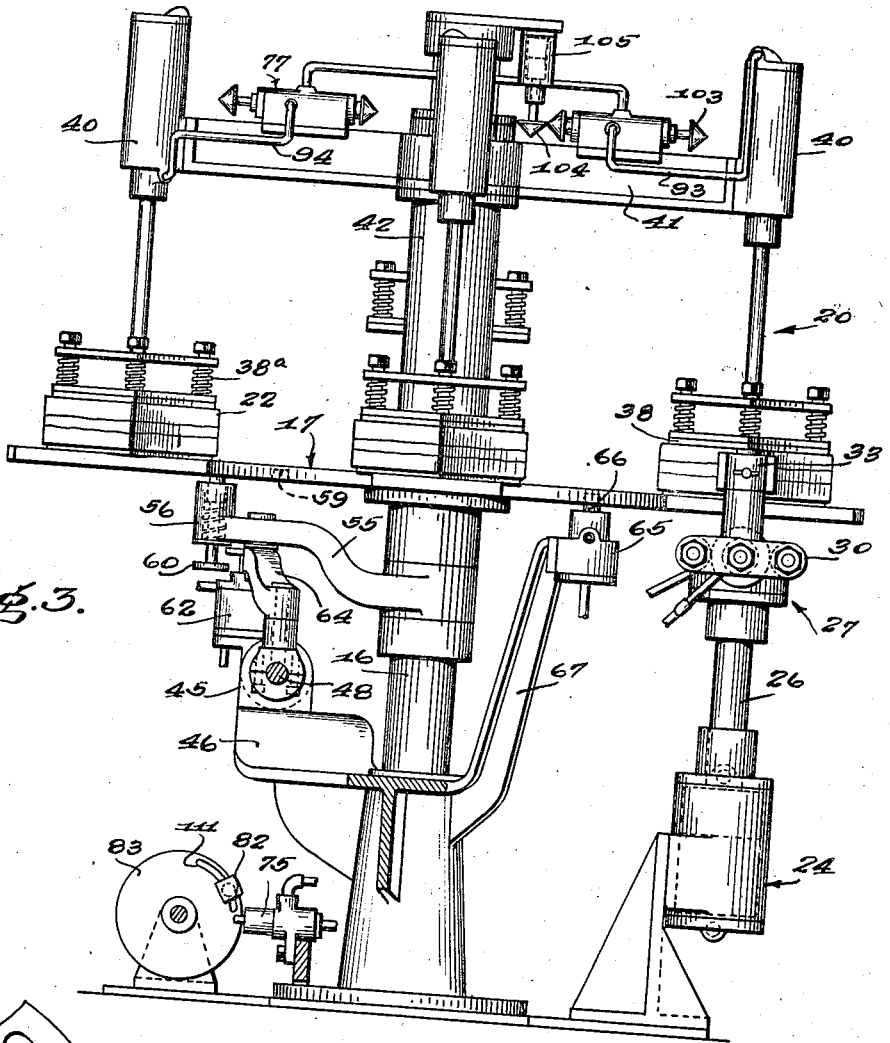
Fig. 3 is a side elevational view of the machine.

Referring to Figs. 1, 3 and 5, the arms 18 of the table are provided with pads 21 or block holders on which the block sections are placed at the loading station A. A pair of block sections to which the bonding material has been applied, are placed together in substantial or approximate alignment on the pad 21. The timer T (to be described presently), rotating continuously, causes the block aligning mechanism 19 to rise to operating position. The mechanism comprises an air operated motor cylinder 24 having a piston 25 therein to which a piston rod 26 is connected. The cylinder 24 is supported on the base 15 and the piston operates vertically beneath the pad 21. A clamping unit 27 (Figs. 1 and 6) mounted on the upper end of the piston rod 26 comprises a casting having mounted therein a pair of opposed pistons 28 provided with piston rods 29 projecting outwardly therefrom and at right angles to the arm 18 of the table.

Cross-heads 30 in the form of an inverted T are secured to the rods 29 and are provided with guide rods 31 which project into the casting and slidably support the heads in vertical position.

Clamping blocks 33 pivoted on the cross-heads 30 by pins 34 are provided with V-shaped gripping surfaces 35 which are adapted to engage diagonally opposite corners of the upper and lower block sections and move them into alignment as the pistons are drawn inwardly by air pressure controlled by the timer. The blocks 33 may be loosely mounted on the pivot pins 34 or held in fixed position by thumb screws 36 (Fig. 6).

Immediately upon conclusion of the clamping operation the pressing head 20 is lowered into contact with the block to firmly press the block sections together in their aligned position. The pressing head 20 includes a plate 38 which is yieldably mounted on coil springs 38a in order to avoid over-pressing. When the block sections have been pressed together, air pressure is supplied to the inner ends of the pistons 28 to move the clamping blocks outwardly, after which the clamping unit 27 is lowered to a position beneath the arm 18 by the motor 24. The press plate is supported by a piston motor 40 mounted for rotation with the table 17 on one arm of a spider 41. A sleeve 42 surrounding the column 16 rigidly connects the table 17 with the spider and further maintains the pressing head in vertical alignment with the glass block.

After the block aligning mechanism has reached its lowered position, the table is indexed 90° in a clockwise direction to bring the newly joined block to the wiping station B. Mechanism for rotating the table includes an air motor 45 (Figs. 1, 3, 5, and 10) mounted on a bracket 46 formed as a part of the base of the column 16. A piston 47 within the motor carries a rod 48 which extends laterally across the machine and has its outer end slidably supported in a bearing 49. A cushioning device 50 formed on the outer end of the bearing includes a floating piston 51 capable of limited movement axially of the rod. A recess 52 in the inner face of the piston forms a seat for the end of the rod 48. As the rod 48 advances during operation of the motor 45, air under pressure is supplied under control of the timer to the outer end of the piston through a port 53. The piston is thus moved inwardly to be engaged by and cushion the rod 48 as it nears the end of its stroke.

Driving connection between the table 17 and rod 48 includes an arm 55 journaled on the column 16 and having a vertically extending boss 56 formed on its outer end. A plunger 57 or latch member yieldably supported within the boss by means of a coil spring 58 extends through either end of the boss and is adapted at its upper end to engage recesses 59 formed in the under side of the table 17. The recesses 59 are spaced 90° apart for the purpose which will become apparent presently. The lower end of the latch member 57 is provided with a flanged head 60 adapted to be engaged and moved downwardly by a similarly formed head 61 carried by a "pull down" cylinder 62 or air motor mounted on the motor 45. A link 64 pivoted at one end near the boss 56 on the arm 55 has its other end pivotally connected to the piston rod 48, thus providing a reciprocating action to the arm as the motor is operated. Fig. 10 illustrates the position of the arm 55 and rod 48 at the beginning of the table indexing stroke. When air is admitted to the right-hand end of the motor 45, the piston is moved to the left, drawing the arm 55 and moving the table through 90° of rotation.

The table is periodically held against rotation during the return or idle stroke of the piston 47 by a latching motor 65 which is controlled independently of the "pull down" cylinder 62. The motor comprises a piston operated plunger 66 adapted to engage one of the recesses 59 and hold the table against rotation during the aligning and wiping operations. The motor is supported on a stationary bracket 67. The timer unit controlling the operation of the motor cylinder 65 may be adjusted to disengage the latch 66 just prior to the indexing stroke. Upon completion of the indexing stroke the latch 66 enters the recess 59 and holds the table against creeping or moving while the other operations are in progress.

When the arm 18 bearing the joined block sections comes to rest at the wiping station B, block wiping mechanism 70 (Fig. 2) is brought into operation. The mechanism generally includes a pair of recurved or arcuate arms 71 pivoted near their inner ends to a slide block 72 and provided on their outer ends with substantially triangular wiping blocks 73 adapted to closely follow the contour of the glass block and wipe or scrape off the excess bonding material squeezed from the joint by the action of the pressure plate 38. An air motor 74 may be employed for reciprocating the arms and slide block to complete the wiping operation. Reference may be had to the Patent of Charles E. Hawk, No. 2,181,810 issued November 28, 1939, for a more detailed description of the wiping mechanism.

Figure 4:
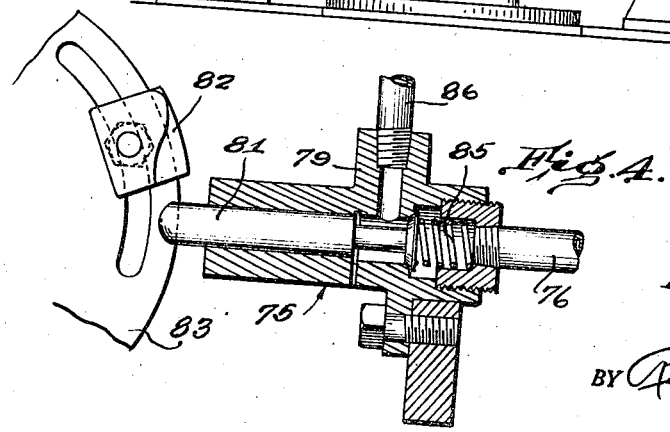
Fig. 4 is a sectional view through a trip valve, taken on line 4—4 of Fig. 1.

Air under pressure is supplied to a series of trip valves 75 (Figs. 3, 4, 9, and 11) through a header line 76 which also may be connected directly to cylinder control valves 77, one of which is employed for each motor cylinder. Each trip valve 75 (Fig. 4) comprises a casing 79 having a valve 80 therein, the stem 81 of which projects outwardly and is adapted for engagement with an adjustable operating button 82 or block carried on a disk 83 to be described presently. A coil spring 85 within the casing maintains the valve in closed position. Pipes 86 lead from the casing to the control valves 77 which are of a spool type similar to the valve shown in section in Fig. 8.

Generally each valve includes a body 88 having a sliding valve core 89 therein. The air supply line 76 connects with the valve through a port 90 medially of the body, the core 89 being adapted to place the port 90 in communication with ports 91 and 92 connected respectively by pipes 93 and 94 to opposite ends of the motor cylinder. Ports 95 permit exhausting air to escape from the cylinder. Fig. 8 illustrates the means for supplying air under pressure to the rotating spider 41 for operating the pressing cylinders 40. A chamber 98 formed in the bearing of the spider is in constant communication with a port 99 in the column 16 to which a supply pipe 76 is connected. Packing glands 100 are provided to prevent loss of pressure during rotation of the machine. The valves 77 controlling the cylinders 40 are further provided with rods 102 formed on either end of the valve core 89 and projecting through the ends of the valve body 88. Cone-shaped buttons 103 on the outer ends of the rods are adapted to be periodically engaged by similar members 104 carried by valve operating piston motors 105 of which there are two, one being located at the loading and aligning station for actuating the valve 77 for lowering the pressing plate 38 and one at the take-out station C for reversing the valve and lifting the plate. The rods 102, buttons 103, and motors 105 are employed in order to eliminate the necessity for providing a plurality of sealed rotatable joints for conducting operating air to the valves on the spider 41.

The timing disks 83 (Figs. 4 and 9) are keyed to a common shaft 108 which is driven through reduction gearing 109 by a motor 110. The disks 83 are provided with arcuate slots 111 through which the blocks 82 are bolted for adjustment.

The cycle of operation may be understood by referring to Figs. 7 and 11, the points indicated in Fig. 7 representing the relative positions of the blocks 82 on the disks 83. The cycle begins with the disk *a* operating the "pull down" cylinder 62 for releasing the indexing arm 55 from engagement with the table for a free or idle stroke and followed immediately by the starting disk *b* which controls the motor cylinder 45. During the forward stroke of the piston 47, disk *c* operates to set the cushion 50 through its control valve 77. As the piston 47 reaches the end of the stroke, (Fig. 10) the pivot block of the link 64 on the rod 48 strikes the protruding stem of a trip valve X which is thus automatically operated, and which reverses the control valve 77 and positions it for indexing the table. The tripping of valve X also causes the valve controlling the table latch 65 to be reversed (Fig. 11) to disconnect the plunger 66 from the table. While the table is indexing, disks *d* and *e* operate to raise the "pull down" and table lock and disconnect the cushion from the air supply in readiness for the next forward stroke.

When the table has come to rest and the lock 65 seated under pressure, disk *f* operates to raise the aligning head 27 and at the same time produce the inward stroke of the wiper W. The disk *g* then operates the clamping pistons 28 for aligning the sections of a block placed on the arm 18 of the table. While the clamp is in position, disk *h* operates the trip valve controlling the press heads 20, the head at station A being lowered into pressing engagement with the block, and setting the motor 105 at take-out station C. Disk *i* releases the aligning clamp after which disk *j* operates to return the wiper and lower the aligning head. Disk *k* then causes the head 20 at station C to be raised and at the same time resets the motor 105 at station A.

Modifications may be resorted to within the spirit and scope of the appended claims.

I claim:

1. In apparatus of the character described, a rotary table having radial block holding arms, said arms adapted to support complementary sections of blocks in superposed relationship, means for rotating the table about a vertical axis in a step-by-step fashion to thereby bring the arms successively to a series of stations, mechanism at one station for aligning the sections including a pair of jaws engageable with diagonally opposed corners of an assembled block, a carrier for said jaws, pneumatic means for elevating the carrier to thereby align the jaws and said corners, and pneumatic means for effecting engagement between said jaws and corners.

2. In apparatus of the character described, a rotary table having radial block holding arms, said arms adapted to support complementary sections of blocks in superposed relationship, means for rotating the table about a vertical axis in a step-by-step fashion to thereby bring the arms successively to a series of stations, mechanism at one station for aligning the sections including a pair of jaws engageable with diagonally opposed corners of an assembled block, a carrier for said jaws, pneumatic means for elevating the carrier to thereby align the jaws and said corners, opposed piston motors on said carrier, means connecting the motors and jaws whereby operation of the former moves the jaws into and out of engagement with said corners, and means for actuating the motors in synchronism with movement of the table and carrier.

3. In apparatus of the character described, a rotary table having block holding arms extending outwardly therefrom, said arms adapted to receive pairs of glass block sections in substantially aligned relation, fluid pressure means for intermittently moving said table in step-by-step fashion to bring said arms successively to a series of stations, means for securing the table against rotation during the period of rest at each station; said means being automatically releasable upon movement of the table, aligning mechanism at one of said stations for operatively engaging diagonally opposed corners of the block sections, automatically controlled means for raising and lowering said aligning mechanism to and from operating position, and means for applying top pressure to the glass blocks following operation of the aligning mechanism.

4. In apparatus of the character described, a rotatable table having arms thereon each adapted to receive a pair of glass block sections in superposed relation, pneumatic means for automatically imparting rotary motion to the table at regular intervals in one direction to bring said arms successively to a series of stations, means for automatically locking said table against rotation between periods of movement thereof, block aligning mechanism at one of said stations including a vertically operable air motor, clamping means carried by said motor for operatively engaging diagonally opposed corners of the block sections to positively align them, means for applying top pressure to the block sections immediately following alignment of the sections thereof and maintaining the pressure throughout one cycle of machine operation, and means for automatically controlling the operation of said mechanisms while the table is at rest.

HAROLD L. EASTUS.